March 26, 1940.  E. H. LINDSTROM  2,194,801
LOCKING DEVICE
Filed Dec. 12, 1936  4 Sheets-Sheet 2
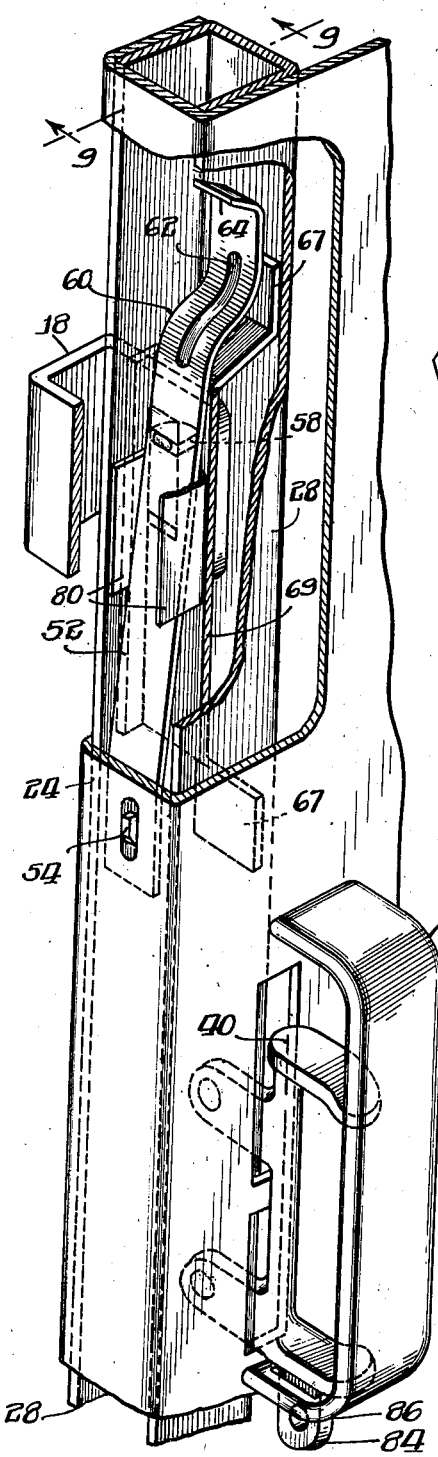
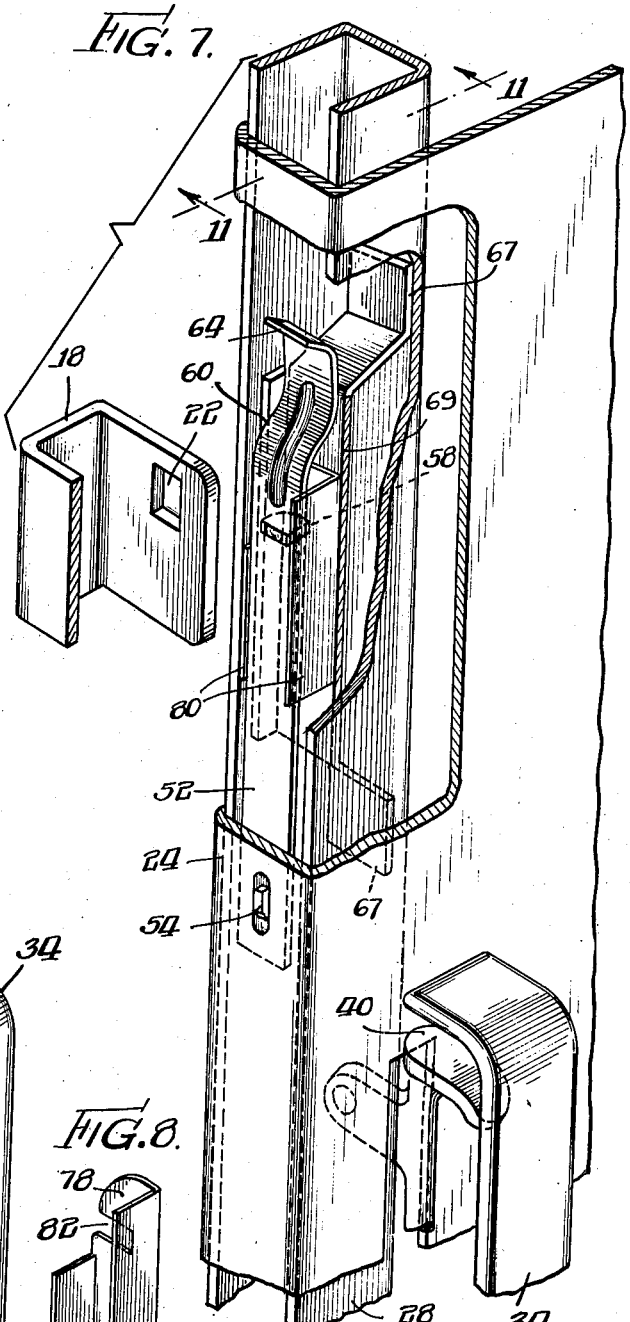
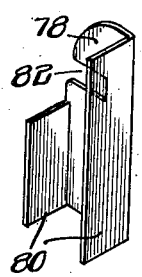
Inventor:-
Elmer H. Lindstrom
By:- Cox & Moore  attys.

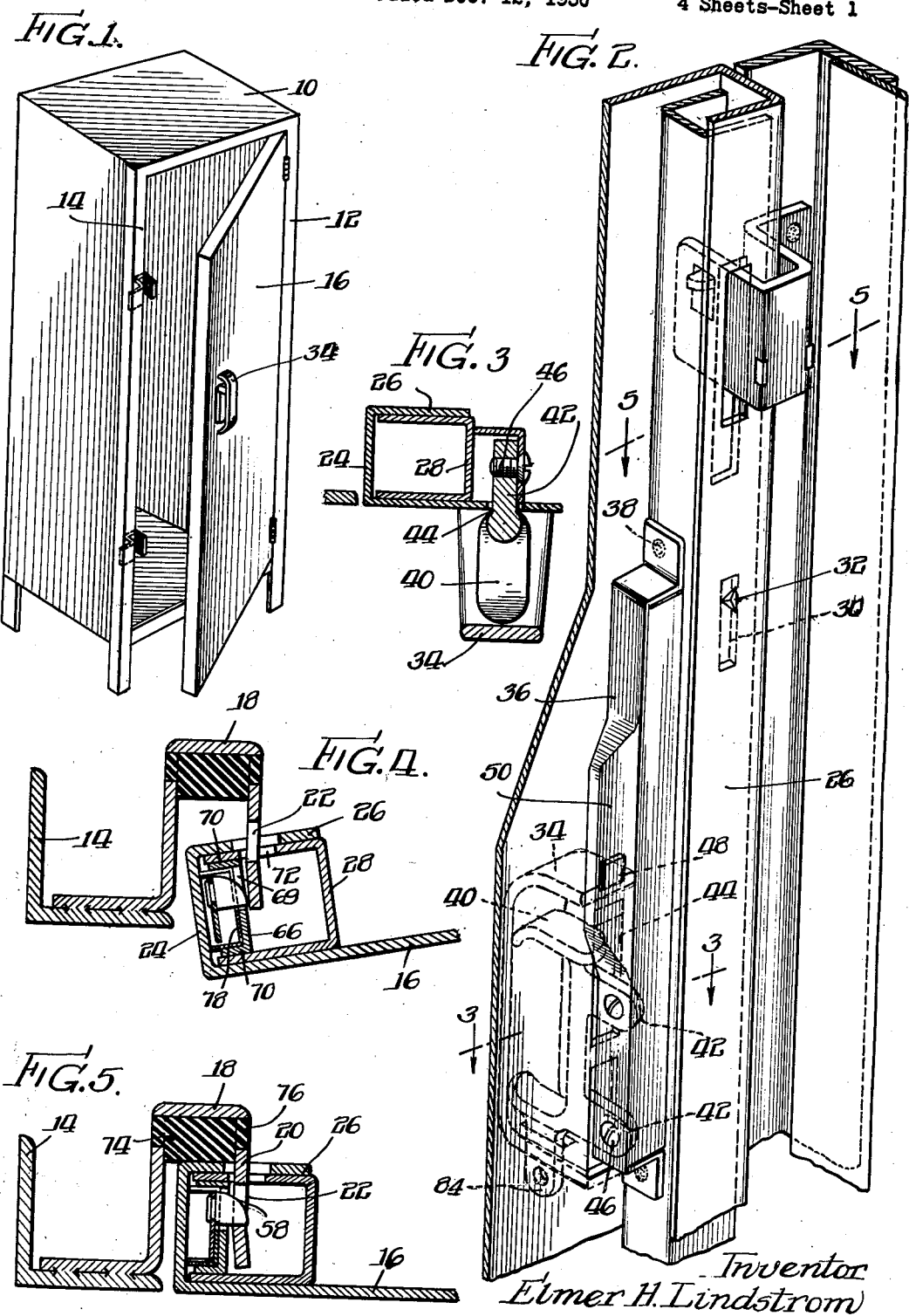

March 26, 1940.  E. H. LINDSTROM  2,194,801
LOCKING DEVICE
Filed Dec. 12, 1936    4 Sheets-Sheet 3

Inventor
Elmer H. Lindstrom
By:- Cox & Moore
attys.

March 26, 1940. E. H. LINDSTROM 2,194,801
LOCKING DEVICE
Filed Dec. 12, 1936 4 Sheets-Sheet 4
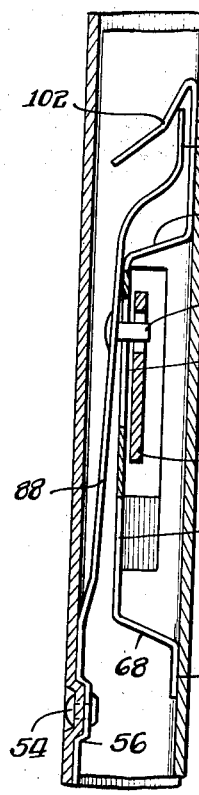
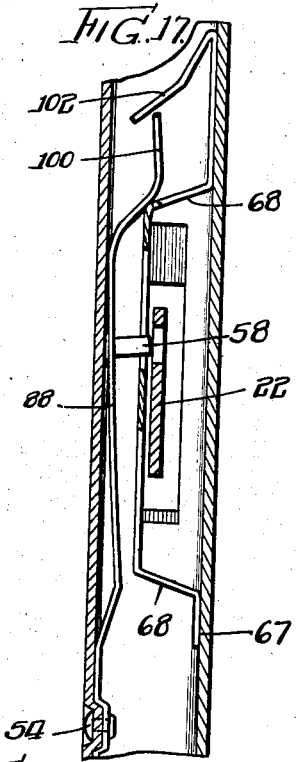
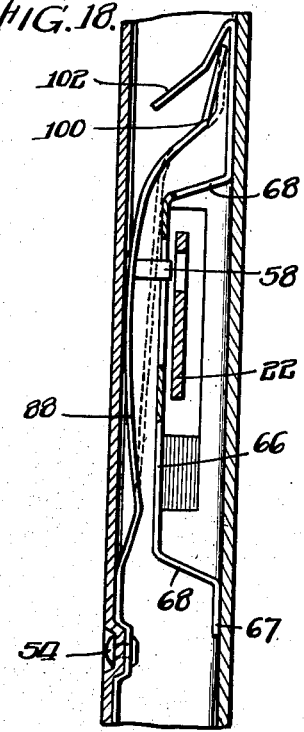
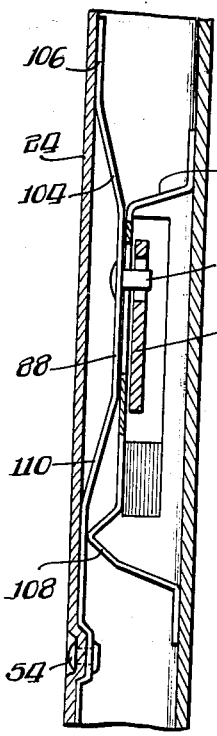
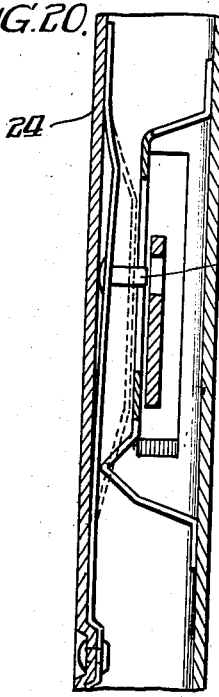
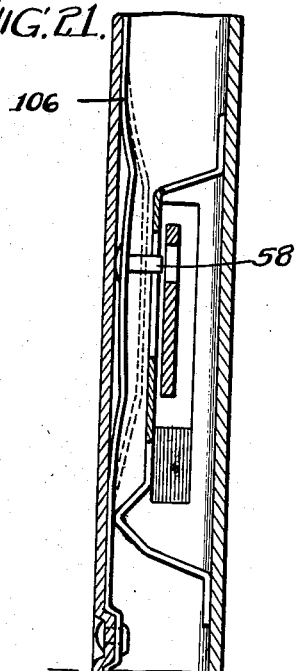
Inventor
Elmer H. Lindstrom
By:- Cox & Moore attys.

Patented Mar. 26, 1940

2,194,801

UNITED STATES PATENT OFFICE 2,194,801

LOCKING DEVICE

Elmer H. Lindstrom, Aurora, Ill., assignor to Lyon Metal Products, Incorporated, Aurora, Ill., a corporation of Illinois Application December 12, 1936, Serial No. 115,598

6 Claims. (Cl. 292—84)

This invention relates to a locking device and more specifically to a device for locking or latching clothes lockers and the like.

It is an object of this invention, therefore, to provide an improved construction wherein a longitudinally movable control bar is employed to release the latching mechanism.

Another object of this invention is to provide an improved automatic latching device wherein the door may be latched by merely moving to closed position.

A further object of this invention is to provide an improved and simplified mechanism wherein a locker door or the like may be placed in locked condition while in the open position, and will automatically lock upon being moved to closed position.

It is yet another object of this invention to provide a mechanism wherein the latch is mounted in fixed vertical relationship and is controlled by a longitudinally movable bar from which it is free except for control purposes.

An additional object of this invention is to provide a device wherein the latch moves only in a single path into and out of engagement with the keeper and under control of the releasing mechanism.

It is furthermore an object of this invention to provide a latch which is protected against picking or tampering by a guard element which protects the latch control.

Another object of this invention is to provide a latching mechanism which is ordinarily maintained in operative position to immediately and permanently latch the door when it is moved to closed position in combination with an improved and simplified release mechanism which is separate from the latch mechanism and adapted to release the latch from its normal locked position.

It is still another object of this invention to provide a latching structure which will act upon the control mechanism and tend to return it to normal inoperative position.

Numerous other objects and advantages will be apparent from a consideration of the following specification and drawings which disclose a few devices constructed in accordance with the principles of the present invention and in which, Figure 1 is a perspective view of a locker made in accordance with the present invention;

Figure 2 is an inside perspective detail view of the locking and latching mechanism;

Figure 3 is a fragmentary plan section taken on line 3—3 in Figure 2;

Figure 4 is a fragmentary plan section taken on line 4—4 in Figure 2 and showing the latching device and keeper at a position before latching takes place;

Figure 5 is a section taken on line 4—4 in Figure 2 and showing the mechanism in full locked position;

Figure 6 is a perspective detail view of the locking mechanism with portions broken away, showing the elements in latched position;

Figure 7 is a perspective view showing the same details as Figure 6, but with the parts in unlatched position;

Figure 8 is a perspective view of the pick-proof guard member;

Figure 16 is a sectional view through a further alternative embodiment;

Figure 17 is identical with that shown in Figure 16 but with the parts in unlatched position;

Figure 18 is identical with that shown in Figures 16 and 17 but showing the action of the latch at the moment of closing the door;

Figure 18 is a sectional view through a further alternative embodiment;

Figure 20 is identical with that shown in Figure 19 but with the parts in unlatched position; and Figure 21 is identical with that shown in Figures 19 and 20 but showing the action of the latch at the moment of closing the door.

Figure 9:
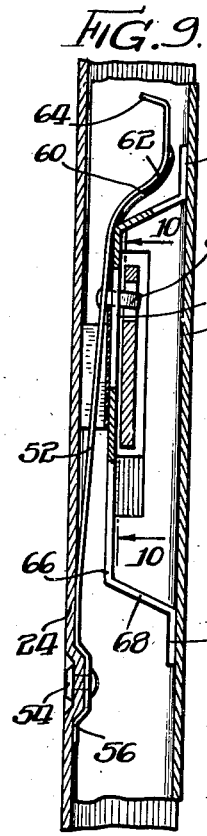
Figure 9 is a partial sectional view taken on line 9—9 in Figure 6.

The illustrative embodiment disclosed involves a conventional type of locker 10 (see Figure 1) having side walls and a door frame formed with side angle members 12 and 14 and a door 16 hinged to the locker member 12 for closure of the aperture. To the interior of the angle member 14 is welded, or otherwise secured, a lug 18 having a flange for abutting the inner face of the angle member and extending into the door opening in generally U-shaped configuration so that there is provided a forwardly extending upper portion 20 having an aperture 22 therein.

The door, preferably formed of sheet metal, has its forward edge turned over to form the inwardly extending flange 24 which is again turned at right angles at a spaced point from the door to form the flange 26 extending parallel to the plane of the door 16.

A channel member 28 is positioned in the enclosure formed by the flanges 24 and 26 and the face of the door 16 and has its base portion across the opening between the flange 26 and the face of the door. The side walls of the channel member are provided with longitudinally extending slots 30 and, after the channel member is positioned within the flanges in the process of manufacture, portions 32 of the flange 26 are deformed inwardly into the slots 30 to maintain the channel in position and thereby form a tubular enclosure at the edge of the door. Moreover, the elongated slots permit limited longitudinal movement of the channel member with respect to the door.

Adjacent the position of the door handle 34, the channel member is provided with an angle member 36 having its ends bent over to form a box-like enclosure and being provided with flanges 38 which may be spot-welded to the channel member. A manual latching control member 40 is positioned interiorly of the handle 34 and has horizontally extending fingers 42 which pass through apertures 44 and are secured to the angle member 36 by machine screws 46 which pass through holes therein and are threaded into the horizontally extending fingers 42.

Thus the latching control member 40 is rigidly connected to the latch control channel member and forms an exterior control for the purpose of sliding the latter member longitudinally.

The door handle 34 is formed with tab portions 48 which pass through complementary openings in the door and are turned over on the interior thereof to position the handle in place. In order to clear the tab portions 48, the forwardly extending face of the angle member 36 is deformed as at 50. Consequently, it will be seen that the angle member forms a box-like enclosure covering the tabs 48 as well as the apertures 44 when the device is in locked position.

The latching mechanism comprises a finger 52 of relatively springy metal which is secured at the bottom end thereof to the inwardly extending flange 24 by a rivet 54. The end of the finger 52 is preferably provided with a depressed bearing surface as at 56 in order that it may be accurately and permanently affixed with relation to the door. A latch bolt 58 is secured to the finger 52, by means of an upset portion, and extends horizontally from, the finger 52. The top of the spring member is bent inwardly as at 60 and provided with an embossed or raised portion 62 and is later rearwardly directed as at 64 for purposes which will hereinafter appear.

A bridge-like member 66 is vertically situated in spaced relationship to the channel member and flange 24 and has bent-over portions 68 terminating in flanges 67, parallel to the base of the channel member and secured thereto as by welding. The vertically extending face of this bridge member is provided with a longitudinal slot 69 forming an opening to permit the latch bolt 58 to operate therethrough. The side portions of this bridge member are turned outwardly at 70 parallel to the door and flange 26 and thus form an enclosure surrounding the spring finger 52.

The flange 26 and the inner side wall of the channel member 28 are slotted as at 72 to permit entry of the forwardly extending keeper member 20 into the tubular enclosure formed at the margin of the door, as shown in Figures 4 and 5. The aperture 22 in the keeper is so positioned as to reside oppositely of the latch bolt 58 when the door is in closed position and it will, therefore, be apparent that, under normal conditions, the bolt will be positioned in the aperture 22 when the door has been shut.

The inwardly curved portion 60 of the spring finger 52 is in normal locking position when it is just above the upper shoulder of the bridge member 66 and extends thereover. Movement of the bridge member upwardly as in Figure 9, however, would cause the upper shoulder to engage the embossed portion 62 and force the finger to the left thereby withdrawing the latch bolt 58 from the opening 22 in the keeper.

The lug 18 is provided at its rearward inner portion with a rubber stop 74 which is held in place by ears 76 registering in corresponding openings in the lug. Thus this rubber member forms an abutment and stop upon closure of the door and absorbs the impact of closure as well as preventing undue noise.

In order to prevent unauthorized tampering, a pick-proof guard shield 78 (see Figure 8) is provided having a generally channel-shaped configuration and adapted to fit within the outwardly turned side walls 70 of the bridge member. The side walls 80 of the guard member are accurately fitted to the space between the inwardly turned flange 24 and the parallel inner wall of the bridge member 66 in order to position it within these confines.

The face of the guard member is cut away at 82 to form an opening only slightly greater in height than the width of the latch bolt 58. Thus this guard member, when inserted in the position shown in the figures, serves to cover the vertically extending slot 69 below the latch bolt and prevent the unauthorized insertion of any instrument with which the spring finger 52 could be pushed back, thereby withdrawing the bolt and permitting the lock to be picked.

Moreover, it is preferred to form the curve 60 and the embossed portion 62 in such a manner that a downward component of force will be exerted against the upper shoulder of the bridge member 66 during the time it is in contact with the said embossment 62. Thus the spring will normally tend to urge the channel member downwardly into latch releasing position. In operation, therefore, the latch and releasing mechanism would normally be in the position shown in Figures 6 and 9, that is, with the channel member in lowermost position and the spring finger 52 tending to urge the latch bolt to the right, as shown in Figure 9, for instance.

Assuming the door is initially open, if it is moved to the position shown in Figure 4, the latch bolt will strike the outer edge of the forwardly extending keeper portion 20 of the lug 18, and, due to its curved inner surface, will be forced backwardly against the tension of the spring 52 to the position shown in Figure 4. When the door moves further inwardly against the stop 74 so that the bolt coincides with the aperture 22, it will be projected therethrough by a spring pressure and the elements will take the position shown in Figure 5.

A padlock or other similar device may be applied through the aperture 86 in the downwardly extending lug 84 to secure the channel member in its downward position such that it will be inoperative to release the latch. This locking may take place while the door is completely open, but it will be obvious that, upon mere closure of the door, the latch bolt will slide past the end of the keeper member and will automatically take its latched position upon registering with the opening 22.

Figure 10:
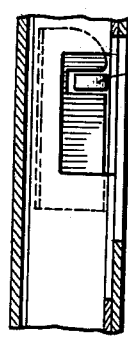
Figure 10 is a partial sectional view taken on the line 10—10 in Figure 9.

When it is desired to unlock and open the door, the particular lock or the like will first be removed from the aperture 86. Then, by merely raising the latch control member 40 manually with relation to the handle 34, the channel member will be forced upwardly carrying with it the bridge member 66. As the free corner of the bridge member rides upwardly, it contacts the curved portion 62 of the spring finger, forcing it to the left as in Figures 9 and 10, the finger carrying with it the latch bolt 58 which will thus be withdrawn from the aperture 22 in the keeper member. The bent upper portion 64 of the spring serves to limit its movement in unlatched position.

It will be apparent, therefore, that the combination of the bridge member and spring results in what amounts to a cam action to control the position of the latch. The combination of the downward component of the spring against the upper protruding edge of the bridge member, together with the force of gravity, will serve to return the channel member to its lowermost position wherein the latch will be permitted, under the influence of its spring, to return to operative position.

Figure 12:
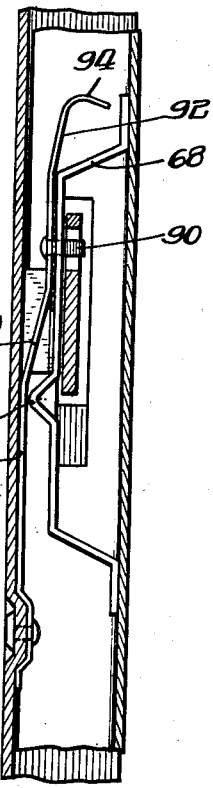
Figure 12 is a detail fragmentary section through a modified form of latching mechanism.

There is shown in Figure 12, a modified form of latch and bridge member construction. In this embodiment, the spring 88 parallels the edge of the door and bends inwardly and upwardly in a reverse curve so that the latch bolt 90 will be horizontally situated in normal latched position. The upper portion of the spring is bent inwardly, first gradually as at 92, and then sharply as at 94.

So, too, the vertically extending face of the bridge member 66 is given a pronounced deformation 96 toward the spring. It will thus be apparent that, if the channel member is raised, the upper shoulder of the bridge member will slide against the angularly extending portion 92 of the spring tending to urge it away from the keeper member 20 and out of the aperture therein. At the same time the outwardly deformed portion 96 of the bridge will press against the inwardly extending section 89 of the spring and perform the same function below the latch bolt. Thus the spring and latch bolt will be more or less evenly pressed in a horizontal direction by forces applied both above and below the latch.

In this modification, therefore, the curved deformation 96 in conjunction with the portion 89 of the spring forms a second cam for the purpose of releasing the latching mechanism. As the upper portion 68 of the bridge member contacts the inwardly and downwardly extending portion 94 of the spring, the latter will produce a considerably increased force in a downward direction, as shown in Figure 13, tending to return the channel member to latch releasing position.

Figure 14:
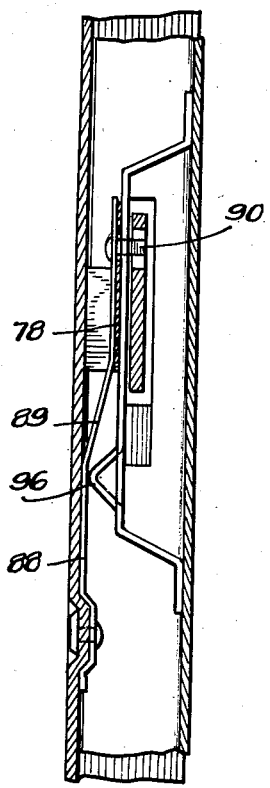
Figure 14 is a sectional view of a second modified form of latching device.
Figure 11:
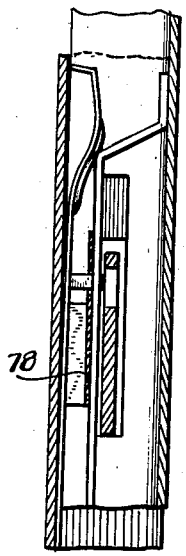
Figure 11 is a section taken on the line 11—11 in Figure 7.
Figure 15:
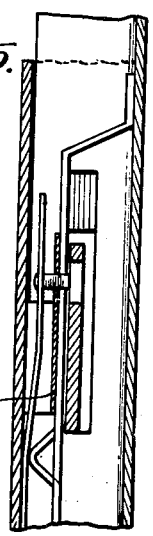
Figure 15 is a view identical with that shown in Figure 14, but disclosing the parts in unlatched position.

Yet another alternative embodiment is disclosed in Figures 14 and 15 wherein the spring finger 88 has a portion extending parallel to the edge of the door for some distance. The inwardly bent portion 89 extends toward the keeper and then terminates in a vertically extending portion to which is secured the latch bolt 90 in the usual manner.

Figure 13:
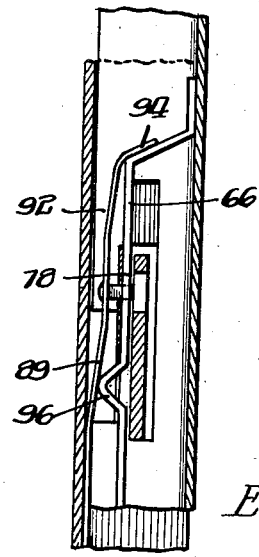
Figure 13 is a view of the same mechanism as shown in Figure 12, but in unlatched position.

It will be apparent that this structure is similar to that shown in Figures 12 and 13 since the bridge member is deformed as at 96 in the same manner as hitherto described. However, the spring terminates short of contact with the upper shoulder of the bridge.

Thus, in operation, the deformation 96, as the bridge is moved upwardly, contacts the sloping portion 89 of the spring and forces it backwardly with the result that the latch 90 is drawn from the keeper. According to this embodiment, the cam portion 96, co-acting with the portion of the spring below the latch, alone is responsible for withdrawal thereof, as shown in Figure 15, there being no co-action between the upper edge of the spring and the corresponding upper shoulder of the bridge member as in the other embodiments.

In the alternative embodiment shown in Figures 16, 17 and 18, the spring 88 is mounted in the manner heretofore described, and secured in place by a rivet 54. Its upper end, however, is bent inwardly and upwardly to form a finger 100 engaged by a hook-like extension 102 of the bridge member 66. Normally when so engaged, the spring and, therefore, the latch, is supported against displacement at its lower end by the rivet 54 and at its upper end by the hook 102. Therefore, in use when the door is slammed with the control bar down, the latch moves rearwardly with the spring 88 taking the position shown in Figure 18, until it registers with the aperture in the keeper. When the latching bar is raised, the hook member 102 rises and frees the finger 100 permitting ready retraction in the manner shown in Figure 17.

The alternative preferred embodiment shown in Figures 19, 20 and 21 comprehends a spring 88 having a rearwardly extending upper portion 104 in a finger 106. Thus the position of the finger 106 adjacent the wall 24, together with the rivet fastening 54, provides support for both ends of the spring against retractive forces.

Release of the latch is accomplished by means of the wedge-shaped portion 108 formed in the bridge member 66 which is adapted to bear against a forwardly and upwardly extending portion 110 of the spring 88. Thus, when the bridge member is actuated upwardly, the wedge-shaped configuration rides upwardly along the portion 110 of the spring, forcing it together with the latch rearwardly and away from the latch keeper.

It will be seen that the bent-up flanges on the bridge member protect and enclose the sides of the spring and that the guard member 78 completes this function by covering the aperture 69 in the bridge member at all points above and below the latch bolt. Thus any instrument inserted for the purpose of pressing back the spring and releasing the latch would be opposed by this member, the side walls 80 of which maintain it in position against any reasonably possible pressure brought through the opening 69.

The aperture 69 is merely for the purpose of permitting co-action between the latch and the opening in the keeper member and is not necessary in the present construction in any manner to support or guard the said latch bolt because the spring mounting is ample to support said latch in all operative positions.

The aperture 69 is proportioned to provide adequate clearance therefor. Moreover, it will be obvious that various shoulders and cam surfaces may be substituted for the bridge member 66 and may be variously positioned in order to contact the latch mechanism and remove it from engagement with the keeper by mere longitudinal movement of the channel member.

Furthermore the latching mechanism, in this construction, is not necessarily attached to a movable control bar but may be permanently, though resiliently, affixed to the door while the releasing mechanism, which is entirely separate in construction and operation, may be set in motion longitudinally in order to contact said mechanism and release it from operative engagement. It is, of course, possible to vary the position of the different elements with relation to the door frame, the door, etc., for instance.

It is thought that the invention and numerous of its attendant advantages will be understood from the foregoing description and it is obvious that numerous changes may be made in the form, construction and arrangement of the several parts without departing from the spirit or scope of the invention, or sacrificing any of its attendant advantages, the form herein described being a preferred embodiment for the purpose of illustrating the invention.

Having thus described the invention, what is claimed as new and desired to be secured by Letters Patent is as follows:

1. A latching mechanism for use with a casing having an opening and a door hinged to said casing for closure of said opening, comprising a cooperable keeper fixed on said casing and forwardly presented endwise to said opening, said door having a flange presented laterally and extending along a margin of said door and having a second inturned flange at the edge of said first flange disposed in parallel relation to the door and slotted to receive said keeper, a spring strip mounted on said door and carrying a latch lug for horizontal movement across said slot, said keeper having an opening therein for receiving the latch, a manually operable bar vertically movable between said flanges, means on said bar to move said latch lug from its keeper engaging position across said slot, a portion of said spring strip engaging said last mentioned means to return said bar to inoperative position permitting said latch lug to return to its keeper engaging position.

2. A latching device for a locker having an opening and a door for said opening, comprising a keeper extending forwardly into said opening, a latch including resilient mounting means on said door for normally urging said latch into a position to engage said keeper, a bar movable with respect to the latch, means to move said bar from an inoperative position into engagement with a portion of said latch and move said latch out of keeper engaging position, and an operative connection between said resilient mounting means and said bar to return said bar to inoperative position permitting said latch to return to its normal keeper engaging position.

3. A latching device for a locker having an opening and a door therefor, comprising a keeper extending forwardly into said opening, a latch resiliently mounted on said door and normally urged into a keeper engaging position, an independent releasing mechanism comprising a bar vertically movable with respect to the door, means on said bar to engage and force said latch from operative to inoperative position when said bar is raised to a predetermined position, and manually operable means exteriorly of said door to move said bar to said latch disengaging position, said bar being automatically lowered under the action of gravity upon release of said manually operable means thereby to permit said latch to return to its keeper engaging position independently of the position of the door.

4. A latching mechanism for use with a casing having an opening and a door hinged to said casing for closure of said opening, comprising a cooperable keeper fixed on said casing and forwardly presented endwise to said opening, said door having a housing extending adjacent a margin thereof, a resilient spring mounting secured to said door, a latch bolt on said mounting and urged by said spring mounting into a keeper engaging position, a bar movable longitudinally of said housing, a cam projection on said bar, means for moving said bar longitudinally to cause said cam to engage said mounting to retract said latch bolt from its keeper engaging position, said spring mounting engaging said bar when moved to latch releasing position for returning said bar to its original position permitting said latch bolt to return to its keeper engaging position.

5. In a locker, a door, a housing adjacent one edge of said door, a latching device comprising a spring in said housing, a latch carried by said spring, a keeper member on said locker, means to permit said keeper to enter said housing and be engaged by said latch, a bar movable longitudinally in said housing and having a cam surface thereon adapted to engage said latch and constrain it from engagement with said keeper, and shielding means surrounding said spring whereby to protect the latch against unauthorized release.

6. In a locker, a door, a stationary keeper, a latch resiliently mounted on an edge of the door for movement parallel to the plane of the door, a manually operable channel latch bar slidable longitudinally of said edge of the door, said channel latch bar enclosing the latch and being adapted to receive and enclose the latch engaging portion of the keeper when the door is in closed position, cam means carried by the bar in position to engage and move the latch out of engagement with the keeper, said latch comprising a spring engaging said cam means when in latch releasing position for moving the cam means and the latch bar to a normal inoperative position permitting the latch to return to its keeper engaging position.

ELMER H. LINDSTROM.